June 3, 1952 — O. E. ANDRUS — 2,598,961
IRRIGATION REGULATOR COUPLING
Filed Dec. 10, 1945
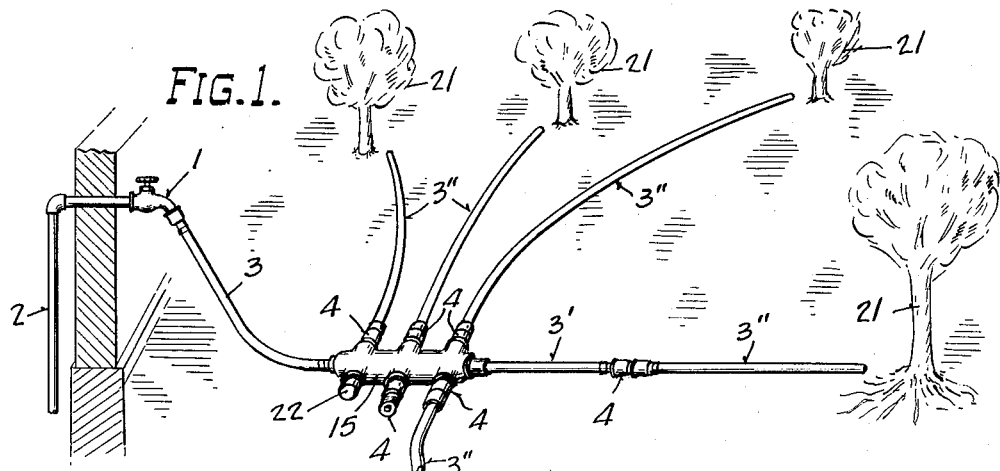
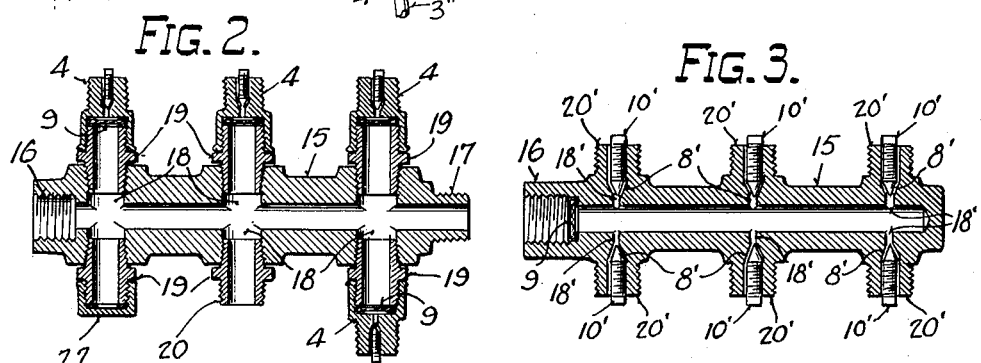
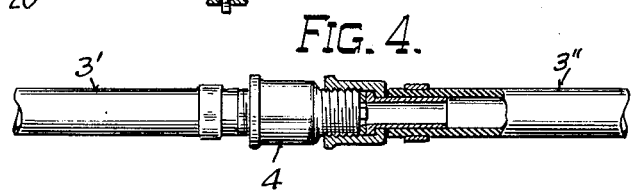
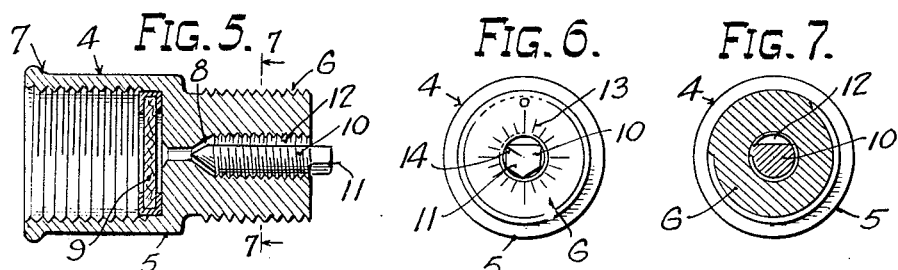
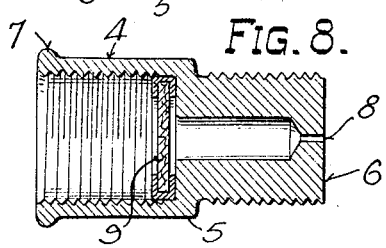
Orrin E. Andrus
INVENTOR.
BY
ATTORNEY.

Patented June 3, 1952

2,598,961

UNITED STATES PATENT OFFICE 2,598,961

IRRIGATION REGULATOR COUPLING

Orrin E. Andrus, Altadena, Calif.

Application December 10, 1945, Serial No. 633,962

6 Claims. (Cl. 137—78)

This invention relates to an irrigation regulator coupling particularly useful in the watering of shrubs and trees in arid and semi-arid regions.

One of the objects of the invention is to provide a hose coupling and the like constituting a flow regulator for the water eliminating the objectionable features of automatic sprinklers and of manual watering systems, and adapted to supply water to the ground beneath shrubs and trees at a rate corresponding more nearly to the diffusion rate of the water in the soil, thereby preventing water wastage by undesirable run-off and drainage, and providing automatic water supply without the requirement of substantial personal attention as in the case of sprinklers.

Another object is to prevent leaching of fertilizer out of the soil around the roots of the plant by excess drainage of water washing through the soil.

Another object of the invention is to provide a means of producing deep penetration of water in the soil substantially co-extensive with the root system of plants being watered, thereby enabling the application of dissolved fertilizer to the root system with a minimum of loss from excess water and resultant drainage.

Another object is to provide an irrigating device and system that will facilitate gradual application of water to the soil over long periods of time to obtain more thorough and efficient moistening of relatively deep and large root growths.

Another object is to provide for ready adjustment of the flow of irrigation water in hose and the like without utilizing or injuring the regular shut-off valve for the system.

Another object is to provide a simple and low-cost hose coupling and the like that is adjustable to determine the flow of water therethrough.

Another object is to provide such an adjustable flow coupling with an indicator facilitating resetting of the same to predetermined flow values within the range of adjustment.

Another object of the invention is to provide a manifold system utilizing coupling flow regulators for each of the branches thereof to enable individual predetermined regulation of the flow from the several outlets or groups of outlets.

Another object is to provide an adjustable flow regulator with the adjustment means inside and concealed against accidental and mischievous tampering and the like.

Another object is to prevent leakage of water externally of the coupling by enclosing the adjustment for the regulator inside the coupling.

Another object is to provide an adjustable flow regulator for irrigation and the like that can be readily cleaned from dirt lodging therein.

Another object is to provide such a flow regulator with means for preventing dirt from lodging where it will restrict the flow.

Another object is to provide a flow regulator for domestic irrigation systems with means to prevent the transmission of vibratory noise to the house plumbing system.

Other objects and advantages will be set forth in connection with the description of specific embodiments of the invention illustrated in the accompanying drawings.

In the drawings:

Figure 1 is a diagrammatic illustration of an irrigation system employing the flow regulators of the present invention.

Fig. 2 is an enlarged plan view of the manifold with parts broken away and sectioned to show the regulators;

Fig. 3 is a view similar to Fig. 2 showing a modified form of manifold with the regulators therein;

Fig. 4 is an enlarged view of a single hose of Fig. 1 with the regulator in a coupling therefor;

Fig. 5 is an enlarged axial section of a flow regulator coupling;

Fig. 6 is an end view of the coupling of Fig. 5;

Fig. 7 is a transverse section taken on line 7—7 of Fig. 5; and

Fig. 8 is a view similar to Fig. 5 showing a flow regulator coupling without an adjustment means.

Domestic sprinkler systems for lawns, shrubs and trees in arid or semi-arid regions usually start with a regular shut-off faucet or valve 1 at the terminal of a water supply pipe 2 extending upwardly from an underground piping system or through the foundation wall of a house, and to which a regular garden hose 3 is attached.

The sprinkling of lawns is accomplished either by attaching a sprinkler on the end of the hose 3 and frequently moving the same to different locations on the lawn, or by attaching an adjustable spray nozzle to the hose and manually directing the same about the lawn. Such methods are generally unsuitable for watering shrubs and trees since they apply the water in such quantities that it runs off without properly soaking in, and once a running stream is started it tends to prevent the desirable penetration of the water to the root system. Large quantities of water as where the water is applied too rapidly have a tendency to wash down through the soil and drain into the substratum, taking fertilizer and valuable soil constituents with the water. Furthermore, the manually directed spray nozzle requires constant personal attention, and even sprinklers require frequent changes in location to be most effective, and neither can be left to operate for substantial periods of time without attention.

The present invention provides a simple low-cost flow regulator that can be applied to the hose in the form of a coupling 4 between two sections of hose or at either end of the hose and which automatically restricts the flow of water from the hose to a desired quantity, preferably just sufficient to correspond with the rate of diffusion of the water into the soil throughout the root system of the plant or plants being watered. Such a regulator may be left operating over night or throughout a longer period without danger of washing away the fertility from about the plant or of water wastage.

The regulator 4 may be placed at or near the inlet end of the hose so that the major part of the hose does not have to carry water at high pressure, the flow therethrough being only at a very much reduced rate determined by the regulator. This enables the employment of less costly or less perfect hose for a large part of the system.

The regulator 4 may be of various specific constructions, that shown in Figs. 5 to 7 being adjustable and that shown in Fig. 8 being non-adjustable.

The regulator consists of a circular or hexagonal body 5 preferably having an externally threaded male coupling member 6 at one end and an internally threaded female coupling member 7 at the other end. The body 5 of the regulator has an orifice 8 therein for regulation and restriction of the amount of water flowing through the coupling.

A filter disc 9 may be inserted in the female intake end of the coupling to prevent clogging of the orifice 8.

The disc 9 is preferably of metal, cloth or spun glass screening, or of fibrous construction, and its edges are confined in a circular rubber ring which serves as a washer to seal the joint of the coupling against leakage.

Where the non-adjustable regulator is employed the size of the orifice 8 should be just sufficient to pass the quantity of water desired for the wetting of the ground without over-flow. Couplings having different orifice sizes are provided to meet various requirements encountered.

Where the regulator is adjustable, the opening through the regulator may be made larger, and a valve member 10 preferably having a conical point is threaded into one end of the body 5, preferably through the male coupling member 6, to provide for adjustment of the orifice as desired. The member 10 preferably has its head 11 extending axially from the coupling to provide for grip of the same in turning, and the head may be knurled or made hexagonal to facilitate turning by hand or by pliers or a wrench.

The body of member 10 is longitudinally slotted or flattened along one or more sides of its threads as at 12 to provide for the desired passage of water between it and the coupling member 6.

The conical point on the member 10 may seat in a complementary recess in body 5 to provide adjustment for the orifice 8. Adjustment of the member 10 axially away from its seat opens the outlet for orifice 8 as desired.

When a conical seat is employed a more gradual adjustment of flow is obtainable by the axial adjustment of member 10.

The adjustable regulator preferably has a graduated scale 13 on the end of the male coupling member 6 adjacent the head 11, and which serves to cooperate with an index mark 14 on the head in setting the member 10 for any predetermined flow of water through the regulator.

In the adjustable regulator at least one and preferably both of the coupling members 6 and 7 are threaded with standard threads for garden hose coupling.

The irrigation system may include a single hose containing the coupling regulator 4 or it may include one or more manifolds 15 constructed preferably as indicated in Figs. 2 and 3. The manifold 15 comprises a cast metal tubular body having a threaded female coupling member 16 at its forward intake end and a threaded male coupling member 17 at its opposite end. The hose 3 is connected to the member 16 to supply water to the manifold under pressure and a similar hose 3' may be connected to member 17 to conduct water to another manifold or to constitute an additional outlet for the manifold.

The opposite sides of the manifold are drilled and tapped to provide a plurality of lateral branch passages 18 connecting with the hollow interior of the manifold. Adapters 19 are secured in the manifold for corresponding passages 18 preferably with standard pipe threads that provide tightness of seal. Each adapter 19 has an outer threaded male coupling member 20 for receiving a regulator coupling 4 and is adapted to conduct water from the corresponding passage 18 to the regulator coupling. A hose 3'' conducts the seepage water from each regulator to a desired location adjacent a shrub or tree 21.

The number of branches for the manifold 15 may be varied, but where it exceeds that desired, one or more of the adapters 19 may be capped by an internally threaded cup-shaped cap 22 or by a closed regulator 4. Likewise, the member 17 may be capped to close the same if desired.

The manifold of Fig. 3 has the orifices 8' disposed in each passage 18' and adapters are eliminated. Each passage 18' extends outwardly through a threaded male hose coupling member 20' containing the adjusting member 10'. The filter 9 is preferably seated inside the female coupling member 16. The rear end of the manifold may be closed, as shown.

The invention eliminates noise in the pipe 2 which might be caused by possible throttling and pulsation of the water through the regulator couplings 4, by providing the hose 3 between faucet 1 and the coupling. The hose serves to cushion the transmission of pulsations and vibrations from the throttling device to the piping system 2. The faucet 1 is opened wide and has no throttling action which might produce noise.

Various embodiments of the invention may be employed within the scope of the accompanying claims.

I claim:

1. An irrigation system employing the restricted flow of water in a garden hose, comprising a garden hose, a supply line for water to said hose, and a coupling between said hose and supply line and adapted to restrict the flow of water into said hose substantially to a trickle, the body of said coupling having means for securing the same to the end of the hose and having at least one orifice for the flow of water therethrough, and an adjusting member threaded axially into the body and adapted to seat axially thereagainst to adjust the size of the orifice and determine the flow of water.

2. In an irrigation system employing garden hose and the like, a manifold secured to a supply hose and adapted to receive water under pressure, a plurality of outlets for said manifold embodying restricted passages governing the flow of water therefrom, and a plurality of discharge hoses secured to said outlets, said discharge hoses being substantially free of internal pressure by reason of said restricted passages discharging into the same.

3. In an irrigation system employing garden hose and the like, a manifold adapted to be interposed between a supply hose and a plurality of discharge hoses, said manifold comprising a body having an inlet coupling member for connecting to the supply hose and a plurality of outlet coupling members for connecting to the corresponding discharge hoses, the outlets for said manifold embodying individual restricted passages governing the flow of water therefrom to a trickle and serving to prevent any substantial pressure build up in said discharge hoses.

4. In an irrigation system employing garden hose and the like, a manifold adapted to be interposed between a supply hose and a plurality of discharge hoses, said manifold comprising a body having an inlet coupling member for connecting to the supply hose and a plurality of outlet coupling members for connecting to the corresponding discharge hoses, the outlets for said manifold embodying restricted passages governing the flow of water therefrom to a trickle and means concealed in the several outlets for adjusting the trickle of water therethrough, whereby said discharge hoses are substantially free from internal pressure.

5. In an irrigating system employing a garden hose or the like for conducting water to the surface soil adjacent plants, a coupling comprising a body adapted to be secured between coupling members of two hose sections, an adjustable restricted orifice valve in said body, a valve stem threaded in said body and extending into one of said hose sections to provide for adjustment of said valve upon removal of said hose section, a passageway for the flow of water from one of said hose sections to said valve, and a passageway in said valve stem larger than said first named passageway for the flow of water from said valve to the other of said hose sections, the size of said first named passageway being determined by the adjustable position of said valve stem.

6. In an irrigation system employing garden hose and the like, and a manifold for connection between the supply hose and a plurality of hose sections for conducting water to various points, means for controlling the flow of water to each of said sections comprising a plurality of restricted orifice valves, valve stems therefor threaded in said manifold and extending into each of said hose sections to allow for adjustment of each said valves upon removal of the respective hose section therefor, passageways for the flow of water from said supply hose to each of said valves, and passageways in each of said valve stems for the flow of water from the respective valve to the respective hose section, said last named passageways being larger than the orifices of said valves, and said valve orifices being determined in size by the adjustable position of said valve stems.

ORRIN E. ANDRUS.

REFERENCES CITED

The following references are of record in the file of this patent:

UNITED STATES PATENTS

| Number | Name | Date |
|---|---|---|
| 707,318 | Geyer et al. | Aug. 19, 1902 |
| 707,712 | Nethery | Aug. 26, 1902 |
| 726,395 | Bedworth et al. | Apr. 28, 1903 |
| 1,140,420 | Thomas | May 25, 1915 |
| 1,694,838 | Bayha | Dec. 11, 1928 |
| 1,948,503 | Bijur | Feb. 27, 1934 |
| 1,957,828 | Greenwald | May 8, 1934 |
| 1,960,472 | Balaam et al. | May 29, 1934 |
| 2,148,419 | Parker | Feb. 21, 1939 |
| 2,288,715 | Karrer et al. | July 7, 1942 |
| 2,402,729 | Buchanan | June 25, 1946 |